Dec. 27, 1966  D. G. ANDERSON  3,294,994
NUTATION MOTOR OR GENERATOR
Filed May 10, 1963  4 Sheets-Sheet 1

INVENTOR.
DOUGLAS G. ANDERSON
BY
Richard J. Seeger
ATTORNEY

Dec. 27, 1966   D. G. ANDERSON   3,294,994
NUTATION MOTOR OR GENERATOR
Filed May 10, 1963   4 Sheets-Sheet 2

INVENTOR.
DOUGLAS G. ANDERSON
BY
Richard J. Seeger
ATTORNEY

Dec. 27, 1966 D. G. ANDERSON 3,294,994
NUTATION MOTOR OR GENERATOR
Filed May 10, 1963 4 Sheets-Sheet 3

INVENTOR.
DOUGLAS G. ANDERSON
BY
Richard J. Seeger
ATTORNEY

Dec. 27, 1966    D. G. ANDERSON    3,294,994
NUTATION MOTOR OR GENERATOR
Filed May 10, 1963                                          4 Sheets-Sheet 4

INVENTOR.
DOUGLAS G. ANDERSON
BY
Richard J. Seeger
ATTORNEY

United States Patent Office 3,294,994
Patented Dec. 27, 1966

3,294,994
NUTATION MOTOR OR GENERATOR
Douglas G. Anderson, Ferndale, Mich., assignor to The Bendix Corporation, Southfield, Mich., a corporation of Delaware
Filed May 10, 1963, Ser. No. 279,559
6 Claims. (Cl. 310—82)

This invention pertains to a nutation motor or generator of the kind defined in copending application Serial No. 202,228, entitled Nutation Motor, filed on June 13, 1962, by Douglas Anderson, Paul Maker and David Schaffer.

Objects of this invention include providing a nutation device of the type in the aforementioned copending application, wherein is disclosed a nutating gear ring mounted for nutation and rotation which carries an armature ring which is under the influence of a variable magnetic flux field and is caused to roll or wobble against a fixed gear which differs in teeth number from the nutating gear by one thereby advancing the nutation gear one tooth width in a rotational direction for every nutation of the nutating gear.

This invention supplies a variation of that construction by providing a nutating device in which gear teeth are not utilized. This is accomplished by journalling a shaft for rotation about a first axis and providing the shaft with an extension which makes an angle to that axis. By journalling a nutating ring for rotation on the shaft extension and causing the nutating ring to wobble or nutate, the shaft is caused to rotate for every complete nutation cycle. In this embodiment there is one complete rotation for every one complete nutation cycle.

The nutating ring is caused to nutate by placing therearound channel shaped pole pieces which have coil windings on the channel legs. A permanent magnet is placed centrally of each pole piece between the legs.

A generator is obtained when the shaft is turned by some external source thereby generating current in the coil windings of the pole pieces and a motor is obtained when current is supplied to the pole piece coil windings causing the nutating member to wobble or nutate due to increasing and decreasing flux lines in the air gaps between the pole pieces and the circumference of the nutating ring.

In the aforementioned copending application, the nutating gear was also the rotating gear. This invention provides an embodiment wherein the nutating gear does not rotate thereby simplifying the mounting of the nutating gear and making possible a divided armature ring. This is accomplished by mounting a nutating gear ring to a flexible diaphragm which is secured to the boss of a housing plate. The gear with which the nutating gear is meshed is fixed to a rotatable output shaft. The gear teeth on the nutating gear differ in number by one from the gear teeth on the output gear and as the nutating gear goes through one cycle of nutation, the output gear rotates an angular distance equal to the sector subtended by one gear tooth width.

Further, the pole pieces in the aforementioned application which were placed to cause the nutating gear to wobble or nutate, have their windings connected in parallel while in one embodiment of this invention the windings of the pole pieces are connected in series thereby increasing their efficiency.

A further improvement provided by this invention is the division of the armature ring, which is fixed to the circumference of the nutating gear, into segments corresponding to the number of pole pieces in the motor or nutating device thereby making the device lighter and facilitating construction techniques by breaking the magnetic flux path or current path formed by a continuous armature.

These and other objects and advantages will become more apparent when preferred embodiments of this invention are considered in connection with the drawings in which.

Figure 1:
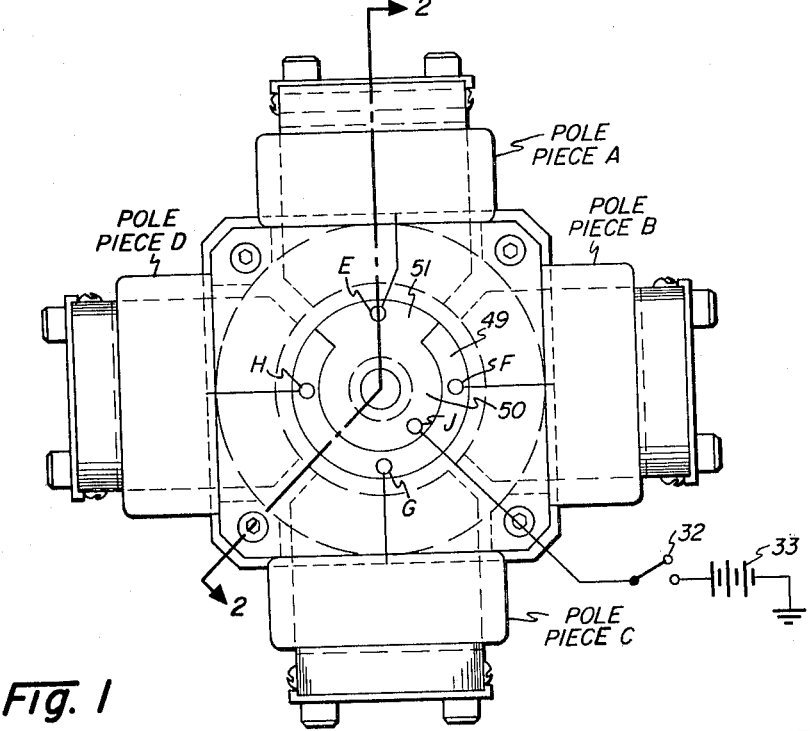
FIGURE 1 is a sectional view taken along 1—1 of FIGURE 2 of a first embodiment of this invention incorporating a gearless device.

Shown in FIGURES 1–4 is a gearless nutation device wherein the nutation of the nutating member turns the output shaft one revolution per nutation cycle. A base 21 is fixedly mounted to its environmental frame, not shown. Bolted to base 21 is an open end block 22 which is in fixed relation to a shaft end block 22a and spaced from block 22 by a stator ring 23. Stator ring 23 has four legs 23a, 23b, 23c and 23d, of which only leg 23a is shown, to which are bolted four pole pieces A, B, C and D respectively. Pole pieces A–D are spaced 90 degrees apart as shown in FIGURE 1 and each comprises a channel shaped member of magnetic material having outer legs 24a–24d, 25a–25d respectively which have coils 26a–26d, 27a–27d respectively wound thereabout. As will be brought out later in connection with FIGURE 4, which is the winding schematic, each coil is composed of two separated windings.

About the legs 23a–23d are wound coils 28a–28d respectively which coils are constantly energized with a constant potential to provide steady state flux paths which will be described later. In this way, legs 23a–23d act as permanent magnets.

Figure 2:
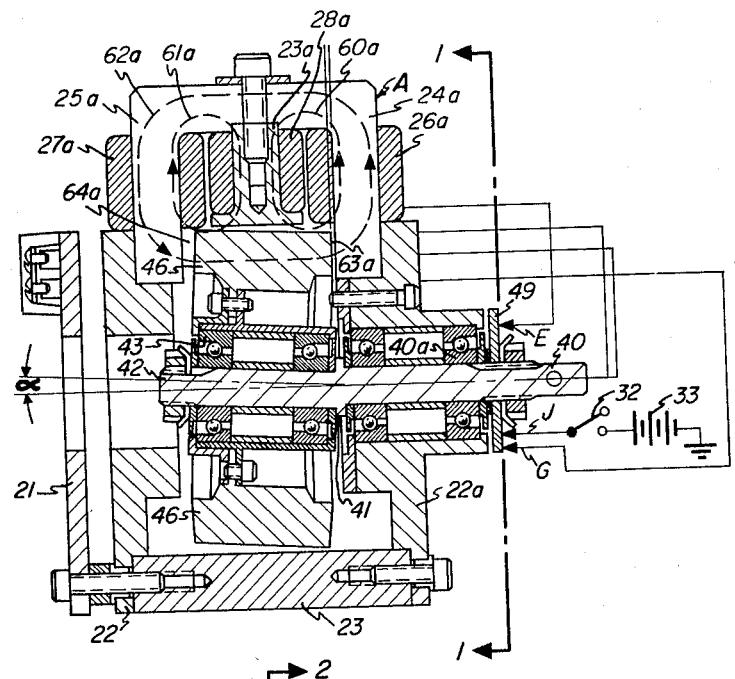
FIGURE 2 is a section taken along 2—2 of FIGURE 1.
Figure 4:
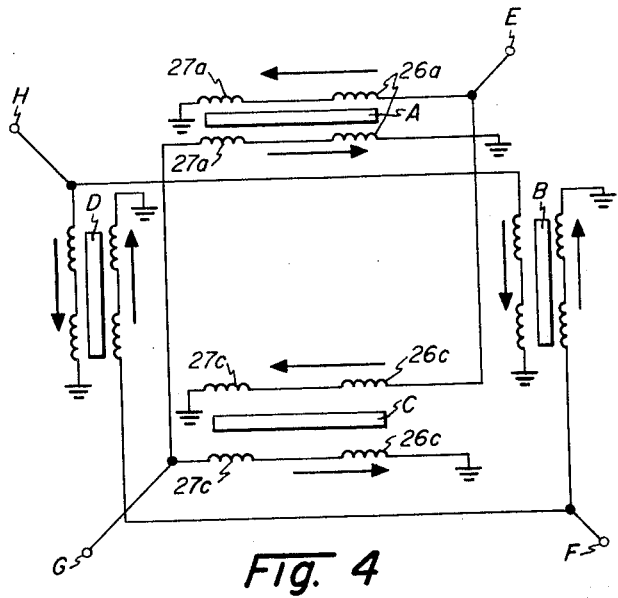
FIGURE 4 is a coil winding diagram of the embodiment of FIGURES 1–3.

Four coil brushes E, F, G and H, of which only brushes E and G are shown in FIGURE 2, are connected to the coils wound about the pole pieces A–D respectively as will be explained in connection with the winding schematic of FIGURE 4, and a common brush J which is connected through a switch 32 to a direct current power supply 33.

Output shaft 40 is journaled in ball bearing assembly 40a which are supported by block 22a. A shoulder 41 is formed on shaft 40, and extending leftwardly therefrom at an angle alpha, which is the nutating angle, is a shaft extension 42, which supports ball bearing 43 assembly which are journaled in armature ring 46 which is formed of a magnetic material. In this embodiment α is 2°30′. As will be understood by those skilled in the art, every time armature ring 46 experiences a nutation cycle, which means that every point on ring 46 has been tilted towards the right once, shaft 40 will rotate one complete revolution.

Figure 3:
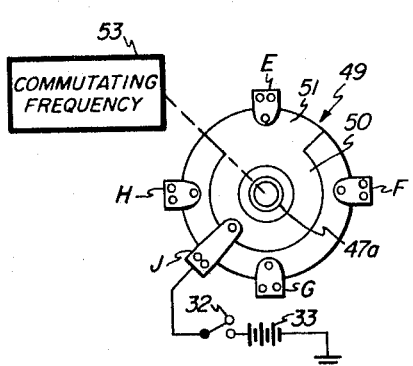
FIGURE 3 is an enlarged view of the commutator segment of FIGURE 1.

A commutating disc 49, shown in FIGURES 1–3, has an inner conductive ring 50 and an outer conductor portion 51 which covers the circumference of a quadrant of the disc 49. With this arrangement it is seen that at least one of the brushes E, F, G and H, which are connected respectively to the windings of pole pieces A, B, C and D, and which are spring urged against disc 49, is in electrical communication with a brush J which is spring urged against the inner conductive ring 50 of commutator disc 49. Connected to brush J through a switch 32 is a direct current voltage source 33. This provides the commutating action of changing the current sequentially in the coils of pole pieces A–D to cause the nutating action. Commutator disc 49 is rotated by output shaft 40 and hence is self-commutated. If desired, disc 49 could be rotated by an external commutating source thereby providing external commutation.

The brushes and coil windings, which in this embodiment are in parallel, will now be described in connection with winding schematic shown in FIGURE 4. Brush E has a winding that has a portion in coil 26a and a portion in coil 27a and carries current in the direction of the arrow; brush E also has a winding which has portions in coil 26c and 27c and carries current in the direction of the arrow. By connecting each brush through windings in opposite pole pieces, when one portion of the periphery of the nutating ring 46 is attracted towards the right, the portion diametrically opposed on the nutating ring is attracted towards the left by the opposite pole piece.

In pole piece A the winding 28a establishes two paths of flux 60a and 61a going in the direction shown by the arrows in FIGURE 1. The flux created by the coils 26a and 27a in pole piece A is shown by dotted line 62a and flows in the direction shown by the arrow. It is seen that this flux reinforces flux 60a and opposes flux 61a so that the flux in air gap 63a is much greater than the flux in gap 64a thereby attracting the top of ring 46 causing it to move to the right. At the same time in the opposite pole piece C the winding attached to brush E causes flux concentration in the corresponding air gaps to cause the diametrically opposite portion of ring 46 to move to the left.

For the same reasons and in the same manner brush F is connected to windings on pole pieces B and D, brush G is connected to windings on pole pieces A and C and establishes flux in a direction opposite to that for brush E, brush H is connected to windings on pole pieces B and D and establishes flux in a direction opposite to that for brush F.

Operation of FIGURES 1–4 embodiment

Briefly then, the operation of this embodiment will be discussed in reference to FIGURES 1–4. Switch 32, which may be a reversing switch for reversible motor operation, is closed causing a potential at the common brush J which communicates this potential to the brush which is in contact with outer segment 51. This will cause a magnetic flux to be established in opposite pole pieces, depending on which brush is contacted. When brush E is contacted, the flux created by the coil windings on pole pieces A and C will be such that the flux formed in the air gaps between armature ring 46 and pole piece A and C urges the top portion of the ring as viewed in FIGURE 2 rightwardly and the bottom portion leftwardly. As the other brushes are contacted, corresponding pole piece coil windings are energized to cause ring 46 to be successively tilted along all diameters.

Figure 5A:
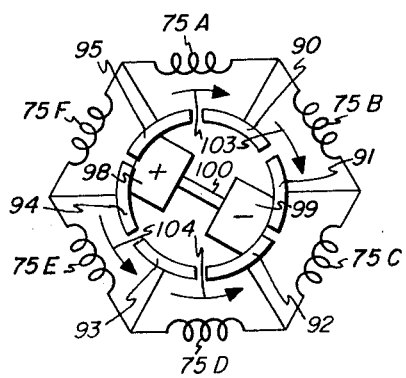
FIGURE 5a is a schematic showing of the coil winding of the embodiment of FIGURE 5.
Figure 5:
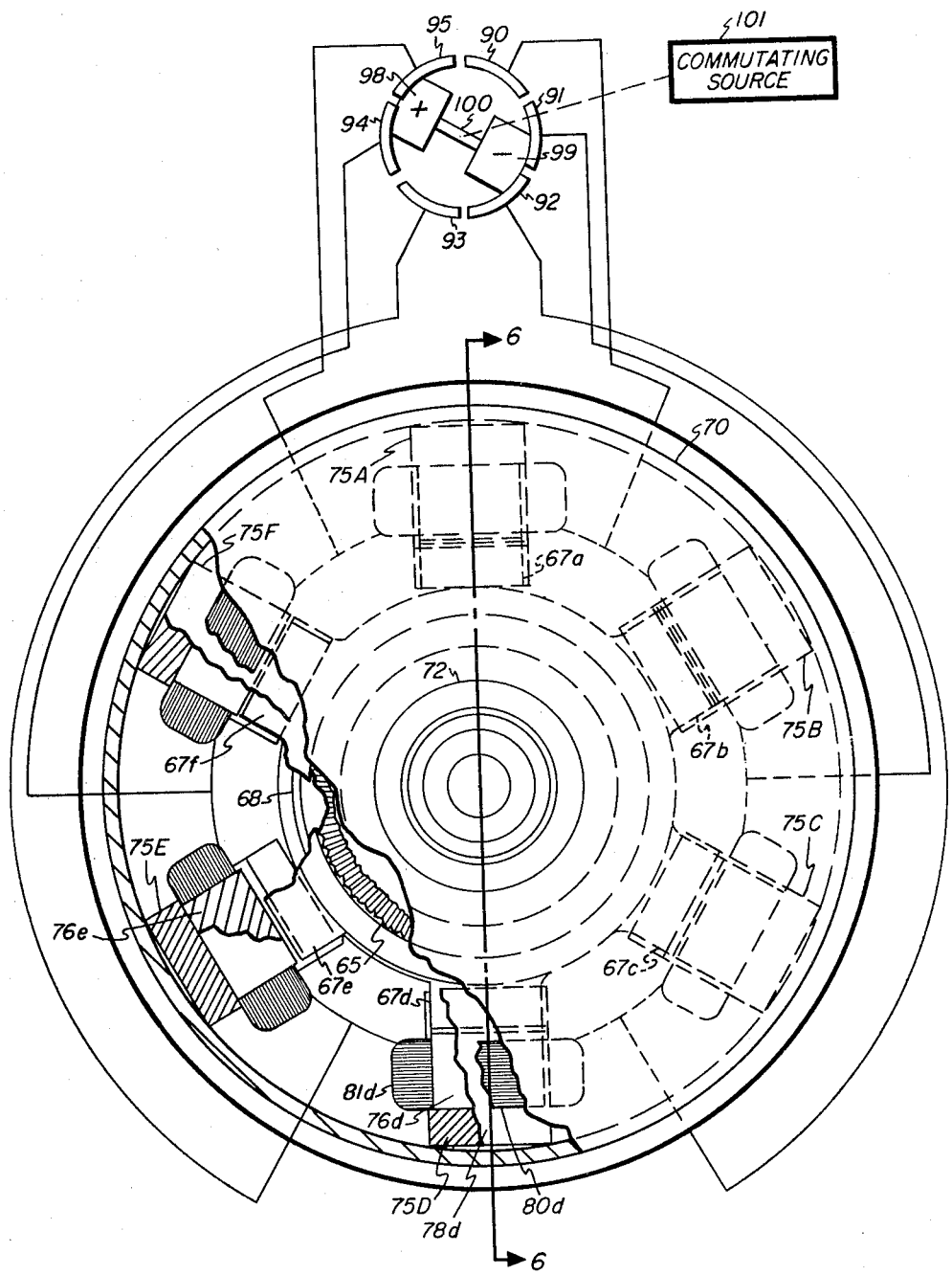
FIGURE 5 is a partially broken away plan view of a schematic showing of a second embodiment of this invention incorporating series coil windings, divided armature, and nonrotating nutating ring.
Figure 6:
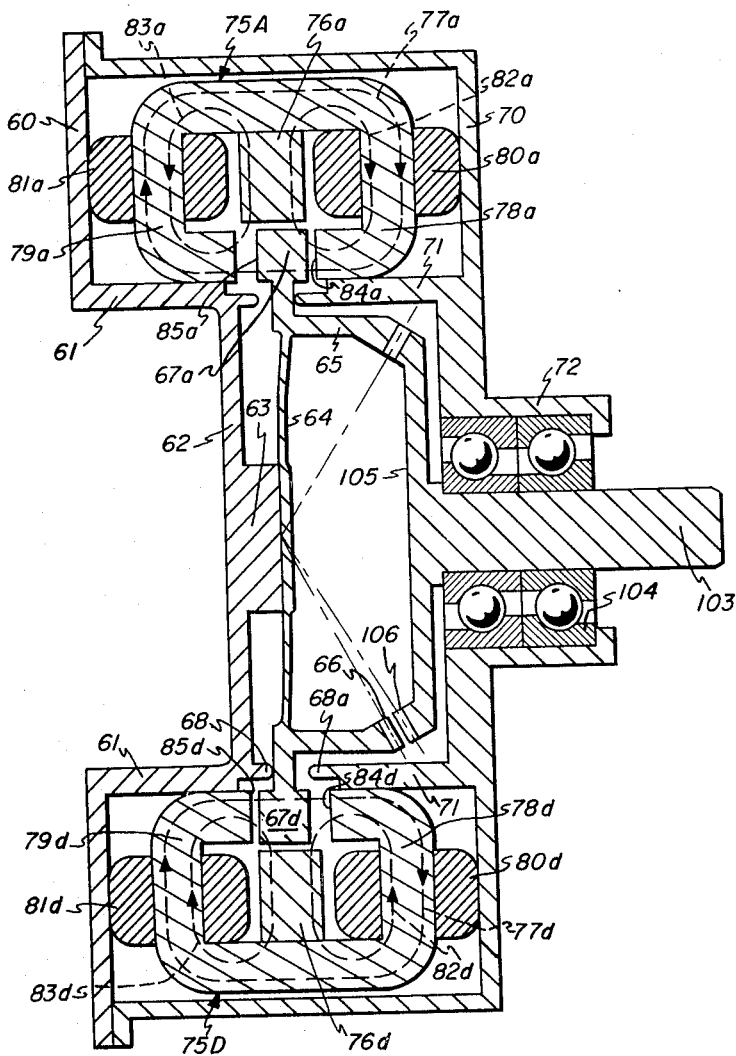
FIGURE 6 is a section of the embodiment of FIGURE 5 taken along 6—6.

The embodiment of FIGURES 5–7

A second preferred embodiment which employs a non rotating nutating gear ring, pole windings which are connected in series, and a divided armature ring attached to the nutating gear ring will now be described with the aid of FIGURE 5–6.

A plate 60 having a covered annulus 61 formed centrally thereof is fixed to its environmental housing, not shown. Formed on the covering 62 of annulus 61 is a boss 63 to which is fixed a flexible disc 64 which carries at the perimeter thereof a gear ring 65 having gear teeth 66 formed at the edge thereof. Also carried by flexible diaphragm 64 are six equally spaced armature segments 67a–67f.

Bolted or otherwise attached to plate 60 is a cover 70 having an inner annulus 71 and an outer annulus 72 formed thereon. Supported by annuli 61 and 71 are six equally spaced pole pieces 75A–75F which are C-shaped and have permanent magnets 76a–76f fixed centrally thereof and outer legs 78a–78f and 79a–79f, respectively. Since channel or C-shaped pole pieces 75A–75F are of a magnetic material, the permanent magnets 76a–76f will establish therein flux paths 82a–82f and 83a–83f respectively.

Wound about opposite legs of each C-shaped pole piece are windings 80a–80f and 81a–81f which are wound on pole pieces 75A–75F respectively in such a manner to create flux paths having the directions of 77a–77f in pole pieces 75A–75F, respectively. The windings about each of the pole pieces 75A–75F are connected in series. This is shown in FIGURE 5 where the windings are also shown connected to commutator segments 90 through 95. A brush 98 has a positive voltage applied thereto and a brush 99 has a negative voltage applied thereto with brushes 98, 99 being connected by an insulative bar 100. Bar 100 is turned by an external commutating source 101.

Gear ring 65 is limited in its nutation travel by annular stop ring 68, which is an extension of annulus 61, and stop ring 68a which is an extension of inner annulus 71. Stop rings 68, 68a prevent excessive pressure on gear teeth 66 as will become evident as this description proceeds.

Shaft 103 is journaled in ball bearing assembly 104 which is supported by outer annulus 72. A gear disc 105 is connected to shaft 103 and has formed at its outer perimeter teeth 106 which are in mesh with the teeth 66 on gear ring 65 and differ in number from the teeth in gear ring 66 by one thereby imparting a large transmission ratio which is equal to the number of teeth in gear ring 105 as explained in the aforementioned copending application. Each nutation cycle of ring 65, which nutation cycle occurs when poles 75A–75F are successively energized, causes a rotation of shaft 103 an amount equal to the arc subtended by one gear tooth in gear ring 105.

The manner in which ring 65 is caused to nutate will now be described in connection with FIGURES 5, 5a and 6.

Assuming that the brushes 98, 99 are in the positions shown in FIGURES 5 and 5a it is seen that a current flows in the direction 103 through the windings of pole pieces 75A and 75B to brush 99 and a current flows in a direction 104 through the windings of pole pieces 75E and 75D to brush 99. In the position of the brushes, each of which spans exactly one commutator segment width, no current flows in windings of pole pieces 75F and 75C since commutator segments 94 and 95 are shorted by brush 98 and segments 91 and 92 are shorted by brush 99.

Since windings of pole pieces 75A and 75B have current flow in one direction the armature segments 67a and 67b, which are between the legs of pole pieces 75A and 75B respectively, will be urged in one direction, say towards the right looking at the section of FIGURE 6, and since the windings of pole pieces 75D and 75E have current flow in the opposite direction, the armature segments 67d and 67e, which are between the legs of pole pieces 75D and 75E respectively will be urged in the opposite direction or to the left in FIGURE 6. It should be remembered that armature segments 67a and 67b do not rotate.

The reason that armature segment 67a in the area of pole piece 75A is urged to the right is as follows. As mentioned, flux paths 82a and 83a are established in pole piece 75A by permanent magnet 76a in the direction shown by the arrows. When current flow is through coils 80a and 81a in one direction, the flux path 77a will be established in the direction shown by the arrows. The flux path 82a reinforces path 77a to provide a relatively large amount of flux in a gap 84a, which is between armature segment 67a and the pole piece face, and the flux path 83a diminishes path 77a providing very little flux in gap 85a which is between armature segment 67a and the opposite pole piece face. This large concentration of flux in gap 84a attracts armature 67a towards the right.

If the current through coils 80a and 81a is in the opposite direction, it will be understood that the flux path 77a would also be reversed in direction and the reinforcement of flux would occur in gap 85a and the diminishing of flux would occur in gap 84a tending to move armature 67a to the left.

At this time, as mentioned, the current flow in coils of pole pieces 75E and 75D is in the opposite direction so that for pole piece 75D, flux path 81d reinforces flux path 77d in gap 85d and flux path 82d diminishes the flux in path 77d providing practically zero flux in gap 84d tending to move armature segment 67d in the area of pole piece 75D to the left. As brushes 98, 99 move in a clockwise path, it will be seen that the ring armature segment 67a–67f are attracted in such a manner as to cause a rolling or wobbling motion of gear ring 65 which advances output shaft 103 an angular distance equal to the sector subtended by the width of a gear tooth 106 for each complete nutation cycle of ring 65.

As brushes 98, 99 move in a clockwise direction, the current in a particular winding will first be in one direction, then that winding will be shorted at which time no current will flow in the shorted winding, and then the current will be in the other direction in that winding. This can be seen by looking at FIGURE 5a which shows the current in the winding of pole piece A in the clockwise direction 103. As brush 98 moves clockwise and spans commutator segments 95, 90 no current will flow in the winding of pole piece A. Further clockwise rotation of brushes 98, 99 will cause a current flow in the winding of pole piece A in the counterclockwise direction 104.

A rapidly degenerating current generates in a winding an E.M.F. in the opposite direction, and an additional E.M.F. in this same direction would be applied from brushes 98, 99 before the back E.M.F. had a chance to subside, and a very large voltage would occur in the coils tending to burn them out.

The shorting by the brushes before the reversal of current allows the transient currents in the windings to subside considerably before a current in the opposite direction is applied.

The transverse motion of armature segments 67a–67f changes the division of flux flowing through the legs of pole pieces 75A–75F and this induces a back E.M.F. in the coils wound on the outer legs of the pole pieces. The greater the armature speed, the greater is the amount of the back E.M.F. generated. This armature speed is the greatest at the pole piece which has the greatest influence in imparting nutational movement to the armature. The armature speed is the greatest on a diameter which is 90° from the diameter where the teeth are in engagement.

In a parallel wound motor, this large back E.M.F. is subtracted entirely from the coil voltages which are most influential in imparting nutational motion. However, in a series wound motor, this large back E.M.F. is subtracted from the total E.M.F. of all the coils and therefore its effect is distributed so that the coil voltages which have the most influence in generating nutational motion are diminished by a lesser amount. In other words, in parallel winding of the coils, the back E.M.F. generated in any particular coil has its entire effect on the current in that coil, whereas in a series wound motor all of the coils share the current reduction that is caused by any large back E.M.F. generated at any one of the coils. Since the large back E.M.F. is generated at the very coil which is most effective in producing nutational motion, it is much better to spread the current decreases across many coils than have it all take place at the coil in which it is generated.

As mentioned, one of the advantages of this invention is that it provides a construction in which the armature ring is split into many individual segments. This not only reduces the inertia of the armature ring thereby increasing efficiency and reduces the weight of the motor, which is very important in aircraft and space vehicle applications, but also reduces the possibility of short circuit between various elements of the motor or generator thereby liberalizing system design requirements.

Further, the device of FIGURES 5 and 6 which is series wound may be readily powered by polyphase alternating current in which event no commutation mechanism is necessary.

In addition, in a series wound motor, all of the coils are used, except the two which may be shorted by the brushes, to produce nutational motion instead of just one at a time, or a pair at a time, further increasing efficiency.

While the embodiment shown in FIGURES 1–4 could be operated without journalling ring 46 for rotation about shaft extension 42, the advantage of low inertia during acceleration would be largely absent. After the motor reaches speed, the nutating ring 46 does tend to rotate with shaft extension 42.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:
1. Apparatus comprising
   a frame,
   means for establishing a magnetic field,
   a nutating member mounted through coupling means to said frame,
   said coupling means permitting nutation of said nutating member but limiting rotation of said nutating member,
   nutating member gear teeth being in a circular path on said nutating member around the axis of said coupling means,
   a rotatable member mounted for rotary motion,
   rotatable member gear teeth being on said rotatable member and in a circular path around the axis of rotation of said rotary member,
   said rotatable member gear teeth and said nutating member gear teeth being in mesh,
   the number of teeth in said rotatable member being different than the number of teeth in said nutating member,
   electrical conductor means spatially associated with the magnetic field to convert between the energy of nutational motion and electrical energy,
   means for connecting said electrical conductor means to an external circuit.
2. The apparatus of claim 1 with
   said means for establishing a magnetic field comprising a plurality of individual magnetic circuits spaced about and separate from the perimeter of the nutating member,
   said last means comprising channel shaped pole pieces having legs extending on opposite sides of the perimeter of said nutating member thereby defining an air gap on either side of said nutating member,
   said electrical conductor means being wound upon said channel shaped pole pieces to increase the flux in one of said air gaps and at the same time decrease the flux in the other of said air gaps to cause said nutating member to move in a direction towards the air gap with the increased flux,
   said nutating member having separate portions of magnetic material spaced about its perimeter,
   each of said separate portions of magnetic material being between opposite legs of a corresponding pole piece, the rotation of said nutating member being sufficiently limited to maintain the separate portions of magnetic material between the legs of their corresponding pole pieces.

3. The apparatus of claim 2 with the difference in gear teeth between said nutating member and said rotatable member being one.

4. Apparatus comprising
   means for establishing a magnetic field,
   a nutating member mounted for nutational motion within said magnetic field,
   a rotatable member mounted for rotary motion,
   motion converting means to convert between said nutating motion of said nutating member and rotary motion of said rotatable member,
   electrical conductor means spatially associated with the magnetic field to convert between the energy of nutational motion and electrical energy,
   means for connecting said electrical conductors to an external circuit,
   said means for establishing a magnetic field comprising a plurality of magnetic circuits arranged about the perimeter of said nutating member,
   said electrical conductor means comprising individual conductor circuits associated with each of said magnetic circuits,
   said conductor circuits being connected in series,
   said means for establishing a magnetic field comprising a plurality of individual magnetic circuits spaced about and separate from the perimeter of the nutating member,
   said last means comprising channel shaped pole pieces having legs extending on opposite sides of the perimeter of said nutating member thereby defining an air gap on either side of said nutating member,
   said electrical conductor means being wound upon said channel shaped pole pieces to increase the flux in one of said air gaps and at the same time decrease the flux in the other of said air gaps to cause said nutating member to move in a direction towards the air gap with the increased flux.

5. The apparatus of claim 4 with
   commutator segments,
   said commutator segments being connected to said series connected conductor circuits,
   brush members being connected to a potential source,
   said brush members being substantially equal in width to width of a commutator segment, so that a conductor circuit is electrically shorted before the current changes direction therein,
   means to move said brush means in a path to successively contact said commutator segments.

6. Apparatus comprising
   means for establishing a magnetic field,
   a nutating member mounted for nutational motion within said magnetic field,
   a rotatable member mounted for rotary motion,
   motion converting means to convert between said nutating motion of said nutating member and rotary motion of said rotatable member,
   electrical conductor means spatially associated with the magnetic field to convert between the energy of nutational motion and electrical energy,
   means for connecting said electrical conductors to an external circuit,
   said nutating member carrying at its perimeter an armature of magnetic material,
   said armature being divided into segments,
   said nutating member being non-rotatable,
   said means for establishing a magnetic field comprising a plurality of spaced magnetic field elements,
   said armature segments being aligned with said magnetic field elements.

References Cited by the Examiner

UNITED STATES PATENTS

| Re. 22,549 | 9/1944 | Plensler | 310—82 |
| 2,953,944 | 9/1960 | Sundt | 310—82 |
| 3,115,562 | 12/1963 | Robinson | 310—29 X |

MILTON O. HIRSHFIELD, *Primary Examiner.*

A. J. ROSSI, *Assistant Examiner.*